United States Patent
Boutillier et al.

(10) Patent No.: US 10,331,846 B2
(45) Date of Patent: Jun. 25, 2019

(54) DYNAMIC LINK SERIALIZATION IN NETWORK-ON-CHIP

(71) Applicants: Alexis Boutillier, Campbell, CA (US); Dee Lin, Fremont, CA (US); Monica Tang, San Jose, CA (US); Jonah Probell, Alviso, CA (US)

(72) Inventors: Alexis Boutillier, Campbell, CA (US); Dee Lin, Fremont, CA (US); Monica Tang, San Jose, CA (US); Jonah Probell, Alviso, CA (US)

(73) Assignee: ARTERIS, INC., Campbell, CA (US)

( * ) Notice: Subject to any disclaimer, the term of this patent is extended or adjusted under 35 U.S.C. 154(b) by 0 days.

(21) Appl. No.: 15/391,850

(22) Filed: Dec. 28, 2016

(65) Prior Publication Data

US 2017/0193142 A1    Jul. 6, 2017

Related U.S. Application Data

(60) Provisional application No. 62/272,845, filed on Dec. 30, 2015.

(51) Int. Cl.
*G06F 17/50* (2006.01)

(52) U.S. Cl.
CPC ........ *G06F 17/509* (2013.01); *G06F 2217/70* (2013.01)

(58) Field of Classification Search
USPC ................... 716/136–139, 100–106
See application file for complete search history.

(56) References Cited

U.S. PATENT DOCUMENTS

| | | | |
|---|---|---|---|
| 2010/0180240 A1* | 7/2010 | Davis ................. | G06F 17/5031 716/113 |
| 2016/0180001 A1* | 6/2016 | Adler ................. | G06F 17/5045 716/138 |
| 2016/0283429 A1* | 9/2016 | Wagh ................. | G06F 13/4022 |

* cited by examiner

*Primary Examiner* — Binh C Tat
(74) *Attorney, Agent, or Firm* — Dana Legal Services; Jubin Dana

(57) ABSTRACT

A Network-on-Chip (NoC) link with an upstream bypassable narrowing serialization adapter and a downstream bypassable widening serialization adapter. The serialization adapters are normally bypassed. To avoid sending information on broken wires, bypassing is disabled so that information is serialized to only a portion of the link. Serialization can be applied to any portion of a link down to as little as one bit wire.

3 Claims, 9 Drawing Sheets

DYNAMIC LINK SERIALIZATION IN NETWORK-ON-CHIP

This application claim the benefit of U.S. Provisional Application Ser. No. 62/272,845 entitled SYSTEM AND METHOD FOR DYNAMIC LINK SERIALIZATION IN NOC filed on Dec. 30, 2015 by Alexis BOUTILLIER et al., the entire disclosure of which is incorporated herein by reference.

FIELD OF THE INVENTION

The invention is in the field of semiconductor chips and, more specifically, to fault-tolerant semiconductor chips.

BACKGROUND

Some kinds of chips must be fault tolerant. They must continue to operate correctly, even when errors occur. Some kinds of errors occur from time to time, such as when an alpha particle or a power supply fluctuation causes a data bit to change value. Such errors are known as soft errors. Errors can also occur consistently, such as when a manufacturing defect or a process of wearing out causes signal wires within the chip to be stuck at a 1 or 0, shorted to another wire, or broken. Such errors are known as hard errors. Any errors would cause a conventional chip to fail.

SUMMARY OF THE INVENTION

The invention is directed to safely and dependably enabling a failed chip to function correctly when faced with hard errors.

Fault tolerant chips are often designed with ECC to correct data errors. An ECC code that just provides a desired level of statistical protection against soft errors might provide sufficient protection to compensate for hard errors. However, such an ECC code, in a chip with a hard error, provides insufficient protection against soft errors. The invention bypasses or provides a detour around the point in a chip with a hard error. In embodiments that use bypassing, data throughput is reduced through parts of the chip with errors. In embodiments that provide detours, no throughput decrease occurs.

Network-on-chip (NoC) is the set of wires and logic used to transfer data and other information between functional units in different parts of a chip. NoCs tend to have the longest wires and the longest distances spanned of any logical connections within chips. Because of their large amount of wire length, and their relatively high wire to logic ratio, NoCs are particularly prone to hard errors and furthermore the parts of a chip that can benefit most from error resilient technologies.

NoCs transport information in packets. Network Interface Units (NIU)s near the edges of the network create and consume packets as necessary to complete requested transactions. Packets comprise a header, and may comprise multiple bytes or words of data. Packets are transferred along links, which comprise a set of wires that can carry packet headers and data. Wider links have more wires and provide for more data throughput, whereas narrower links have fewer wires and use fewer resources. Where the link is narrower than the amount of header and data information transferred, the information is sent serially, generally in successive clock cycles. Different links within a NoC can have different serialization. That is, some are wider and some are narrower. Serialization adapters are used in order to connect links of different serializations. A narrowing serialization adapter receives and stores a wide amount of information from a wide link and transmits the information sequentially on the narrower link. A widening serialization adapter receives and stores multiple pieces of information from a narrow link and then transmit the information together on the wider link.

Some embodiments of the invention use software procedures to identify the location of hard errors. Some embodiments use automatic physical link self-checking. Some embodiments use data transport functional checking in a transport network to identify the location of hard errors.

A transport network couples the units is a means of communication that transfers at least all semantic information necessary, between units, to implement coherence. The transport network, in accordance with some aspects and some embodiments of the invention, is a network-on-chip, though other known means for coupling interfaces on a chip can be used and the scope of the invention is not limited thereby. The transport network provides a separation of the interfaces between the agent interface unit (AIU), coherence controller, and memory interface units such that they may be physically separated.

A transport network is a component of a system that provides standardized interfaces to other components and functions to receive transaction requests from initiator components, issue a number (zero or more) of consequent requests to target components, receive corresponding responses from target components, and issue responses to initiator components in correspondence to their requests. A transport network, according to some embodiments of the invention, is packet-based. It supports both read and write requests and issues a response to every request. In other embodiments, the transport network is message-based. Some or all requests cause no response. In some embodiments, multi-party transactions are used such that initiating agent requests go to a coherence controller, which in turn forwards requests to other caching agents, and in some cases a memory, and the agents or memory send responses directly to the initiating requestor. In some embodiments, the transport network supports multicast requests such that a coherence controller can, as a single request, address some or all of the agents and memory. According to some embodiments the transport network is dedicated to coherence-related communication and in other embodiments at least some parts of the transport network are used to communicate non-coherent traffic. In some embodiments, the transport network is a network-on-chip with a grid-based mesh or depleted-mesh type of topology. In other embodiments, a network-on-chip has a topology of switches of varied sizes. In some embodiments, the transport network is a crossbar. In some embodiments, a network-on-chip uses virtual channels.

Some links send header information and data sequentially on the same wires as in FIG. 1(a). That is, the header of each packet is transmitted in One cycle, and therefore has a data throughput penalty of one cycle per packet. Such links are generally as wide as the wider of the header or the data word width. Some links send different portions of header information sequentially as in FIG. 1(b). They penalize the data throughput multiple cycles, as needed to send the header. Such links are generally just as wide as the data, regardless of the amount of information in the header. Some links send header information simultaneously, in parallel, with data as in FIG. 1(c). That is, the penalty for sending the header before the data is None. Such links are generally as wide as the sum of the data word width and the size of the header information. The choice of serialization determines the throughput available for any particular pattern of packets and amounts of packet data.

DETAILED DESCRIPTION

Figure 1:
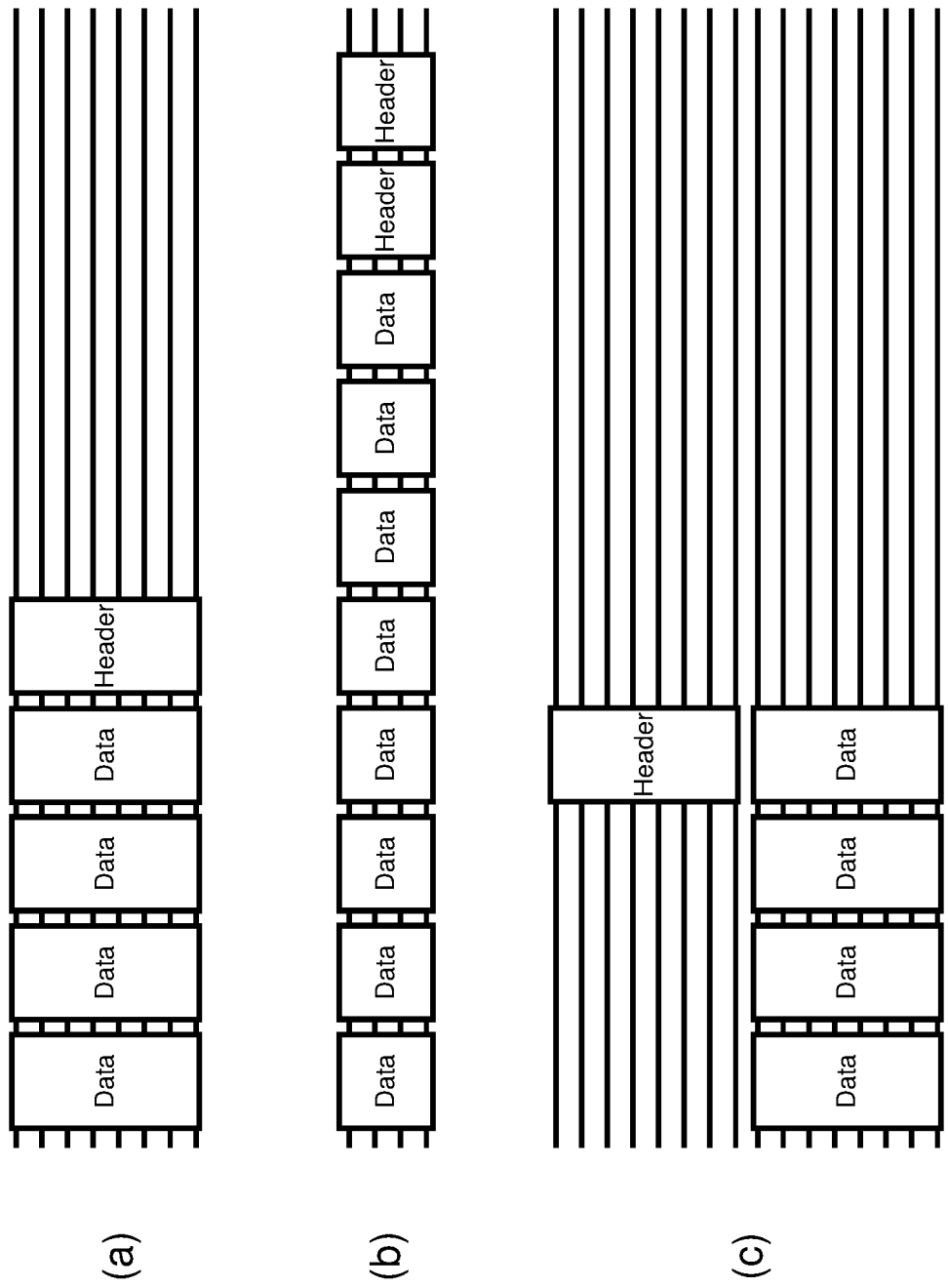
FIG. 1 illustrates header penalty versus wire count in links with configurable serialization according to the invention.

Reference throughout this specification to "one embodiment," "an embodiment," or similar language means that a particular feature, structure, or characteristic described in connection with the various aspects and embodiments are included in at least one embodiment of the invention. Thus, appearances of the phrases "in one embodiment," "in an embodiment," "in certain embodiments," and similar language throughout this specification refer to the various aspects and embodiments of the invention. It is noted that, as used in this description, the singular forms "a," "an" and "the" include plural referents, unless the context clearly dictates otherwise.

The described features, structures, or characteristics of the invention may be combined in any suitable manner in accordance with the aspects and one or more embodiments of the invention. In the following description, numerous specific details are recited to provide an understanding of various embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring the aspects of the invention.

In accordance with various aspects and embodiment of the invention a distributed system implementation for cache coherence includes distinct agent interface units, coherency controllers, and memory interface units. The agents send requests in the form of read and write transactions. The system also includes a memory. The memory includes coherent memory regions. The memory is in communication with the agents. The system includes a coherent interconnect in communication with the memory and the agents. The system includes a second coherent interconnect in communication with the memory and the agents. The system also includes a comparator for comparing at least two inputs, the comparator is in communication with the two coherent interconnects. The features of the system are outlined and discussed below.

A cache coherence system performs at least three essential functions:

1. Interfacing to coherent agents—This function includes accepting transaction requests on behalf of a coherent agent and presenting zero, one, or more transaction responses to the coherent agent, as required. In addition, this function presents snoop requests, which operate on the coherent agent's caches to enforce coherence, and accepts snoop responses, which signal the result of the snoop requests.

2. Enforcing coherence—This function includes serializing transaction requests from coherent agents and sending snoop requests to a set of agents to perform coherence operations on copies of data in the agent caches. The set of agents may include any or all coherent agents and may be determined by a directory or snoop filter (or some other filtering function) to minimize the system bandwidth required to perform the coherence operations. This function also includes receiving snoop responses from coherent agents and providing the individual snoop responses or a summary of the snoop responses to a coherent agent as part of a transaction response.

3. Interfacing to the next level of the memory hierarchy—This function includes issuing read and write requests to a memory, such as a DRAM controller or a next-level cache, among other activities.

According to some embodiments a bypassable narrowing serialization adapter is coupled to an error-prone link on its upstream end. A bypassable widening serialization adapter is coupled to the error-prone link one its downstream end. The serialization adapter is normally bypassed. When it is known that a bit is bad, the serialization adapters are enabled (not bypassed). This allows the chip to function, though with lower throughput than when the serialization adapters are bypassed.

In one such embodiment only a data portion of the error-prone link carries serialized information, and a parallel header portion of the link does not. This avoids additional logic delay in the header path, where timing paths are more critical, and uses the data portion of the link to protect headers. Headers need more protection because they do not use ECC as the data portion does.

Figure 2:
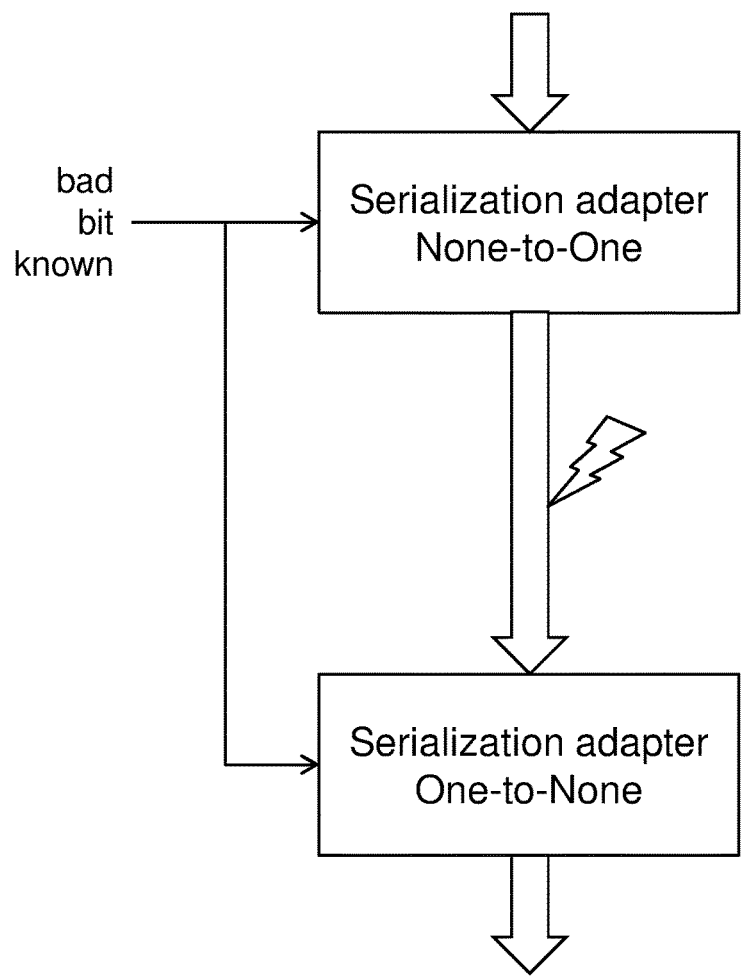
FIG. 2 illustrates an error-prone link with bypassable serialization adapters on the upstream and downstream ends of the link according to the invention.

FIG. 2 shows such an embodiment in which data is sufficiently protected by ECC, and so needs no protection from hard errors. However, the header is not protected by ECC, and must be correct in order to properly transport packets. A link between serialization adapters is serialized with header penalty None to provide maximum data throughput. If a bad header bit is detected, according to this embodiment, a None-to-one serialization adapter is enabled upstream of the link and a One-to-none serialization adapter is enabled downstream of the link. As a result, a portion of the header uses the data wires. This reduces bandwidth, but allows proper transmission of the header across one or more damaged header link bits.

In another embodiment with header penalty One, two bypassable narrowing serialization adapters, in series, but using opposite halves of the datapath wires, are coupled upstream of the error-prone link. Two corresponding widening serialization adapters are coupled downstream.

Each serialization adapter adds a mux in the datapath. In some embodiments, such as the ones above, they are 2:1 muxes. In other embodiments the number of mux inputs can be as many as the number of wires on the wide link. In some embodiments, muxes might have additional inputs for sideband bits to replace any know bad bit(s).

Figure 3:
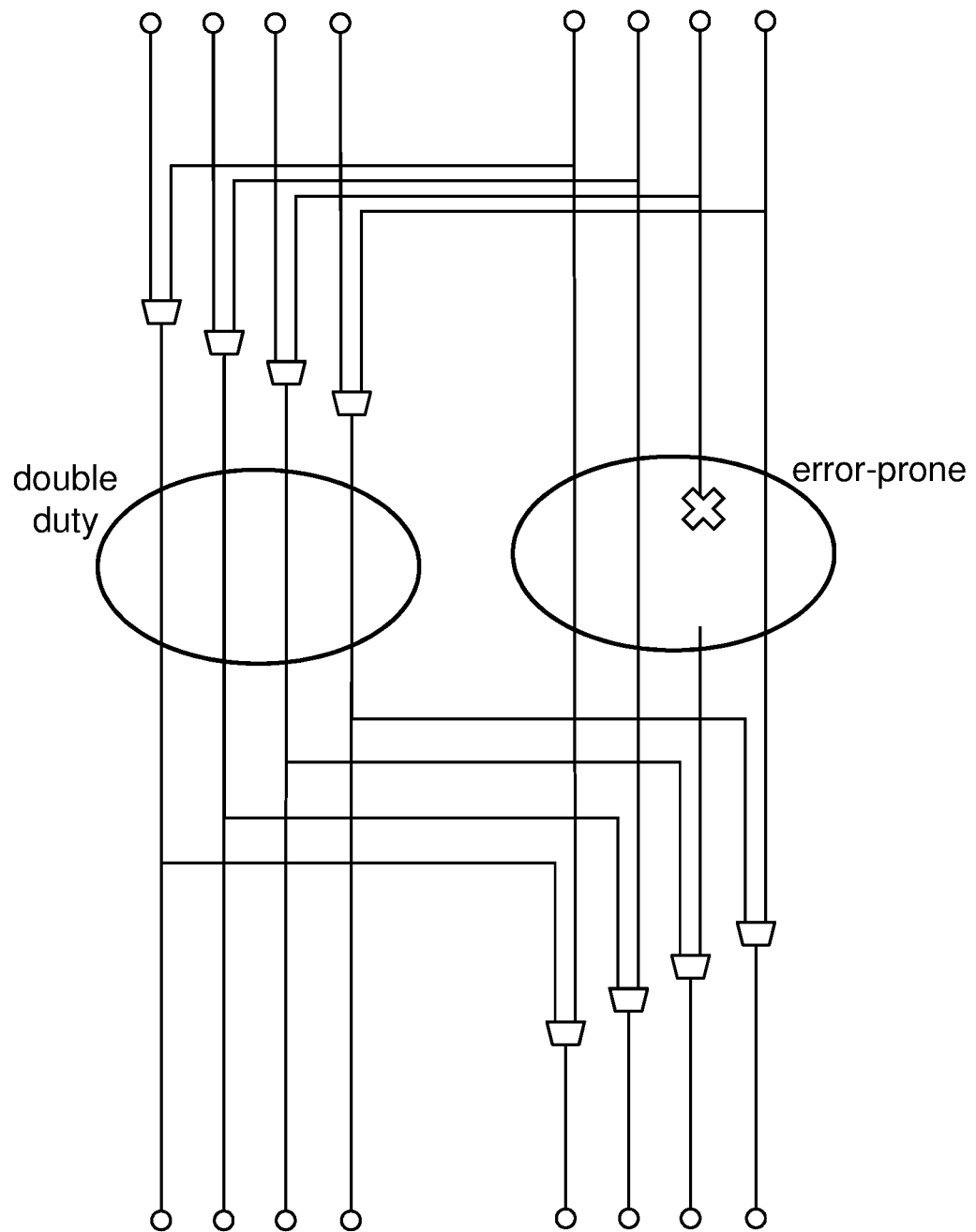
FIG. 3 illustrates muxing bypass wires into half of the datapath wires to avoid an error-prone part of a link according to the invention.

FIG. 3 shows the datapath of an embodiment with serialization of just ½ of a link. The right side of the link is error-prone and carries header information that cannot be corrected with ECC. The left side of the link serves double duty when serialization adapters are enabled. The result is a single 2:1 mux on each link datapath wire.

Figure 4:
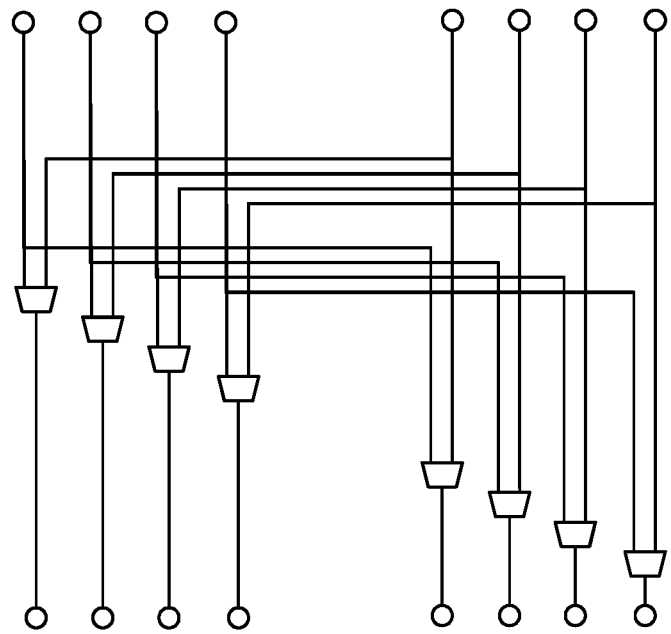
FIG. 4 illustrates muxing bypass wires into both halves of the datapath wires according to the invention.
Figure 4:
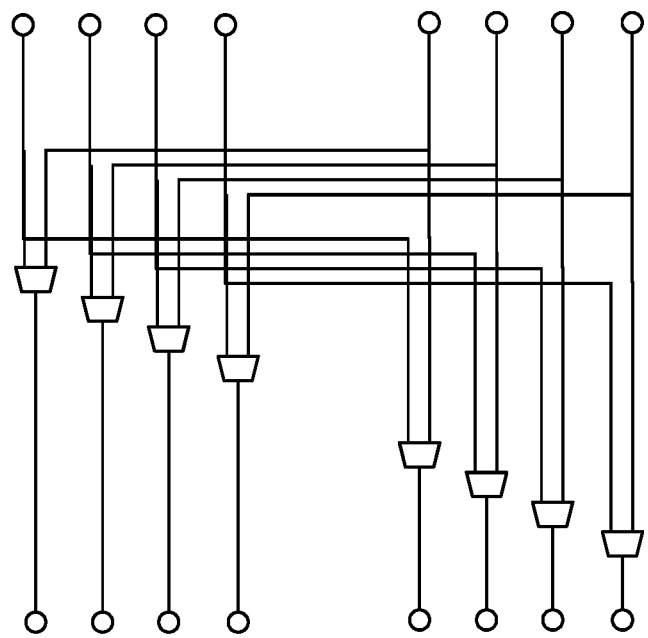

FIG. 4 shows the datapath of an embodiment with serialization of both halves of a link. Both sides of the link are error-prone and need redundancy. Either side can be bypassed onto the other side. The cost is two 2:1 muxes on each link datapath wire.

In one embodiment, when a NoC link is known to be bad, all NIUs with a route that transits the link enables such serialization adapters. This keeps the serialization logic near the edges of the NoC to avoid cluttering a simple transport network. In a simpler embodiment, all NIUs in the chip enable bypass serialization adapters when any link is known bad.

Some embodiments, have NIUs that perform a hardware built-in self test (BIST) procedure when the chip comes out of its reset state. Various BIST methods are known in the art. Some embodiments allow for software to request and control BIST through certain NIU transaction requests. In some such embodiments a simple dependable subsystem, such as one with a dedicate microcontroller, checks the BIST results and controls the serialization adapters.

Some embodiments provide hardware for automatic checking during operation. In some embodiments the automatic checking is performed by NIUs sending special packets that carry no useful transaction data, but use various bits of links. In some embodiments one or more links, themselves, send test signals on various wires at various times to confirm expected operation.

Figure 5:
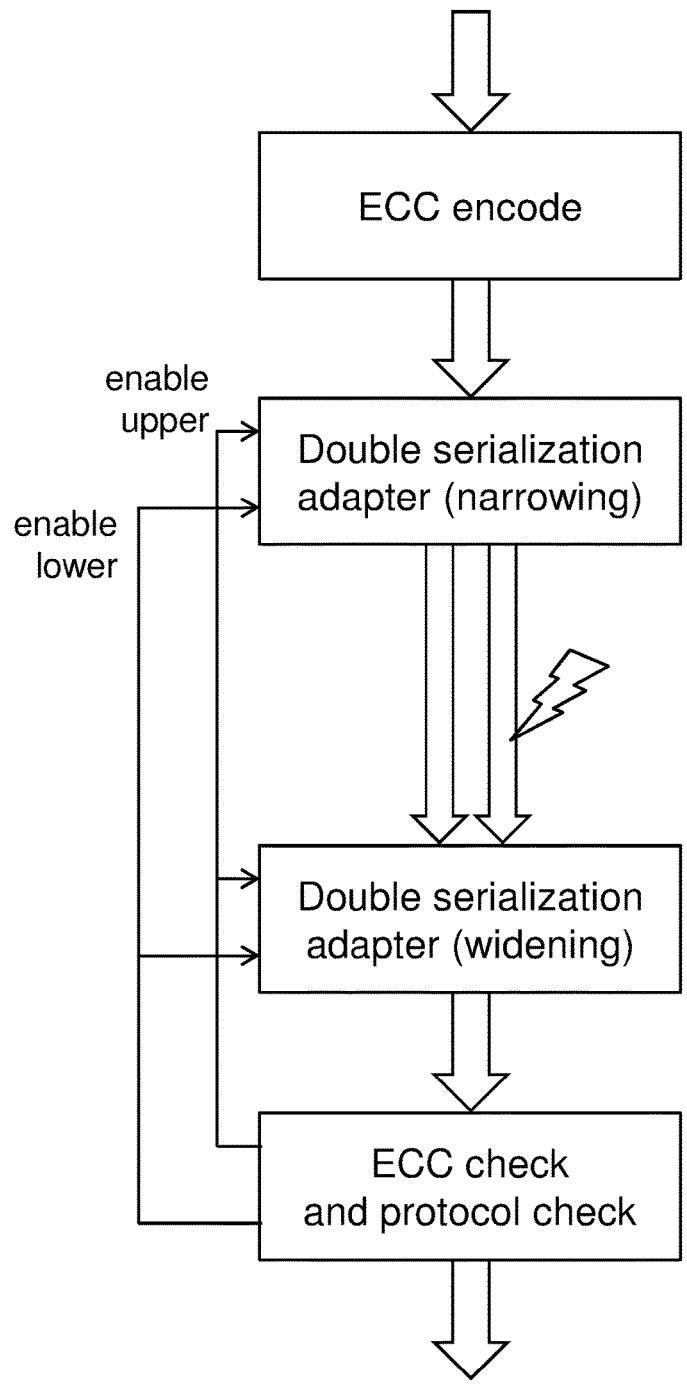
FIG. 5 illustrates bypassable narrowing and widening serialization adapters according to the invention.

FIG. 5 shows another kind of embodiment. On the upstream end ECC is encoded on the packet header and data. In some embodiment a simple parity is used on the physical data and link control signals. Under normal operating conditions information progresses through a double bypassable narrowing serialization adapter in bypass mode. Information traverses the error-prone link, which operate as two parallel bypassable links. Information then progress through the double bypassable widening serialization adapter in bypass mode. Next, information flows into a checking unit. In some embodiments it is a simple parity checking unit. In other embodiments it does an ECC correction on downstream-going data. In some embodiments the checking unit also performs protocol checks, such as detecting that a packet is on a valid route based on the ID of its source and destination. If an error is detected on a wire in the upper half of the long link, then the serialization adapters are enabled (not bypassed) to use only the wires of the lower half of the long link. If an error is detected on a bit in the lower half of the long link, then the serialization adapters are enabled (not bypassed) to use only the wires of the upper half of the long link.

The check uses heuristics to ensure that only permanent errors, not transient errors trigger an error. In some embodiments that is a simple counter, and the bypass is enabled if the count reaches a threshold. In other embodiments it is an error counter with a clock-based decrementer so that the bypasses are only enabled if a threshold of errors is reached within a certain time window.

Self Healing

Other embodiments of the invention are able to heal a link, without losing throughput, by using one or a small number of sideband signals to bypass individual known-bad wires. Since wires of bits within the same link are at high probability of short circuits, have two bypass wires provides more than double the safety benefit.

Some embodiments detect errors and report them for software to enable a bypass. In other embodiments, hardware identifies a failure point and stop using it. At any of every step of the process, an interrupt is asserted to inform software of the problem.

In some embodiments diagnosis is done with a tester shortly after fabrication. In some embodiments diagnosis is part of a power-on self-test. In some embodiments diagnosis occurs during normal operation.

Diagnosis for Self Healing

According to some embodiments each initiator NIUs has a table of links through which it has routes. It also knows the serialization of each link. From time to time the initiator NIU picks the next link from its table and sends a special kind of test packet on a route that traverses the link. In some embodiments the packet header format includes one or more special error codes for physical errors.

The frequency of sending test packets should be rarely enough so as to have negligible degradation of throughput on links, but often enough to detect serious problems within a time frame that corrective action can be safely taken. That might be every 10,000 cycles for some systems.

In some embodiments, the link table does not have an entry for every link through which an NIU has routes. Instead, only links that can be healed, are included in the link table.

If a test packet indicates an error, the initiator NIU marks the link in the table as suspicious and records which link bit (or byte) has the error. It the link is narrower than the NIU packet interface then in some embodiments the initiator checks all copies of the narrow link word within the test packet error to confirm the consistency of the failure. In other embodiments, confirmation may be achieved by one or more following errors from the same bit (or byte) of the same link.

If a link marked suspicious encounters enough errors, or exhibits a sufficiently high error rate to indicate a hard error then the NIU marks it as confirmed bad.

In some embodiments, when a packet reaches a wrong destination NIU it uses logic to compare the incorrect route ID bit to data bits to confirm the error.

In some embodiments target NIUs simply forward test packets back to the originating initiator NIU. In other embodiments target NIUs forward test packets back to initiators, and if an error is detected on a word, the target NIU marks the word as having an error. That way the initiator NIU can confirm if it is a request or response link error.

Different embodiments use different test packet formats, but one kind of test packet includes a data sequence of walking 1 s, walking 0s, a 5-A-5-A-3-C-3-C type of sequence. Test sequences are known in the art. Since the wires of a link is likely to be near each other within the chip floorplan, if they have shorts it is likely to be with another bit of the same link. Therefore, test sequences should be designed to look for double-bad bits.

In some embodiments, initiator NIUs diagnose their accessible links independently and act accordingly. In other embodiments a centralized controller aggregates reports of suspicious or confirmed-bad links. A centralized approach is more helpful for pinpointing exactly which link is bad because most individual initiators will have all routes through certain links so that it is impossible to distinguish one from another.

In some embodiments, rather than detecting precisely which bit or byte of the link is bad, all that is noted is which half, or which quarter, or which of some portion of the link has the problem.

These are just some novel methods of identifying problems. Other methods of identifying problems in systems are known in the art.

Methods of Healing

Links with multiple bytes can be used for healing. The invention is applicable at bit granularity or at granularity of data words larger than one byte, but the applicability will be obvious in light of the following discussion referring to bytes. The following discussion is of links with power of two numbers of bytes, but application to links of other numbers of bytes will be obvious.

According to some embodiments links have serialization adaptors at their ends. Serialization adapters do not modify packet headers. Serialization affects throughput, but the serialization at different links within the network is invisible to endpoint network interface units. Serialization adapters go hand in hand with buffers (FIFOs for narrowing and rate adapters for widening). The relationship is known in the art.

According to some embodiments, healing is applied to ½ of the link, ¼ of the link, just one byte from the link, or any portion of the link. In some embodiments headers and data are treated separately. The trade-off is mux logic depth (logic delay) versus granularity of the throughput vs wires trade-off for redundancy.

Some embodiments perform healing at the transport layer. Some initiator-target pairs have multiple routes. When an initiator NIU detects that a route is bad, it switches route ID to use the other route. To avoid ordering ID violations, the initiator NIU backpressures any requests matching a pending transaction ID until all requests of that ID have provided their response before switching.

Figure 6:
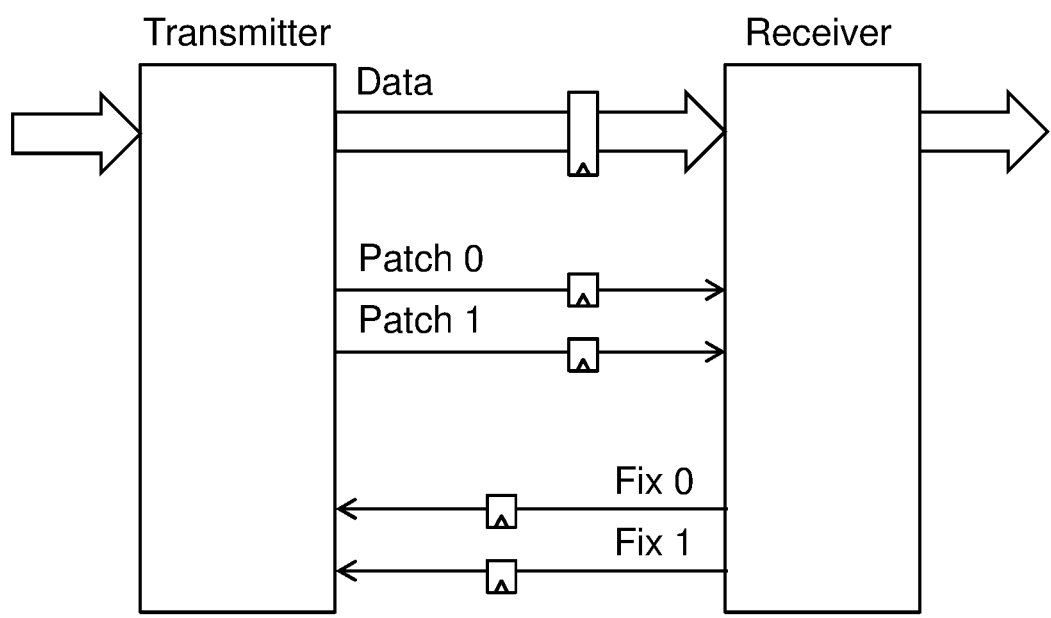
FIG. 6 illustrates an embodiment with Patch and Fix signals on an error-prone link according to the invention.

In some embodiments, the sending end of an error-prone link duplicates one or more selected bit of the bus. FIG. 6 shows one such embodiment. It comprises a transmitter and a receiver coupled to the upstream and downstream ends of a link, respectively. The link comprises an error-prone Data bus, driven by the transmitter; two single patch signals, Patch 0 and Patch 1, also driven by the transmitter; and two Fix signal is driven by the receiver. All signals pass through a pipeline stage register. Various embodiments have any number, including zero, pipeline stages on links, generally as needed to meet clock speed requirements given long distances for link signal propagation.

Figure 7:
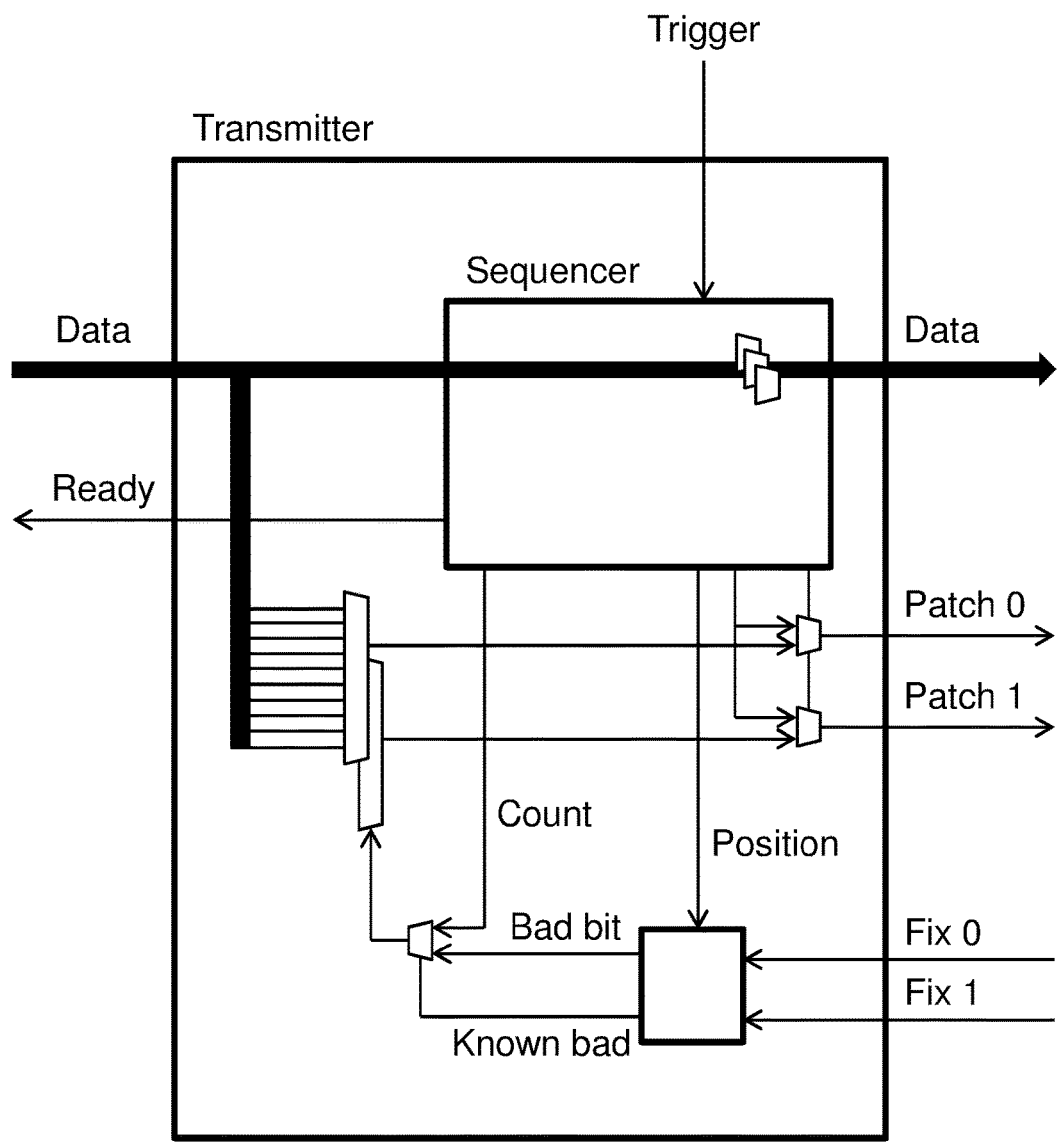
FIG. 7 illustrates a transmitter for an error-prone link with Patch and Fix signals according to the invention.

FIG. 7 shows details of the transmitter. During normal operation, from time to time a Trigger signal is asserted. This causes a Sequencer to send a one-cycle pulse on the Patch 0 signal. The Sequencer proceeds to count cycles through a test pattern during which it drives certain data bus signals with copies of different bits on the Patch 0 and Patch 1 signals. The Sequencer is programmable for different patterns. Walking 1s, walking 0s, 0x5A5A, and 0xC3C3 are common patterns.

The sequencer is configured, at design time, to know the number of cycles of delay on the link due to pipelining. It drives a delay Position signal indicating the bits being tested. If the Fix 0 or Fix 1 signal is asserted, there is a Known bad bit, and the transmitter locks one of the Patch 0 or Patch 1 signals on to copy the bad signal from the Data bus.

Figure 8:
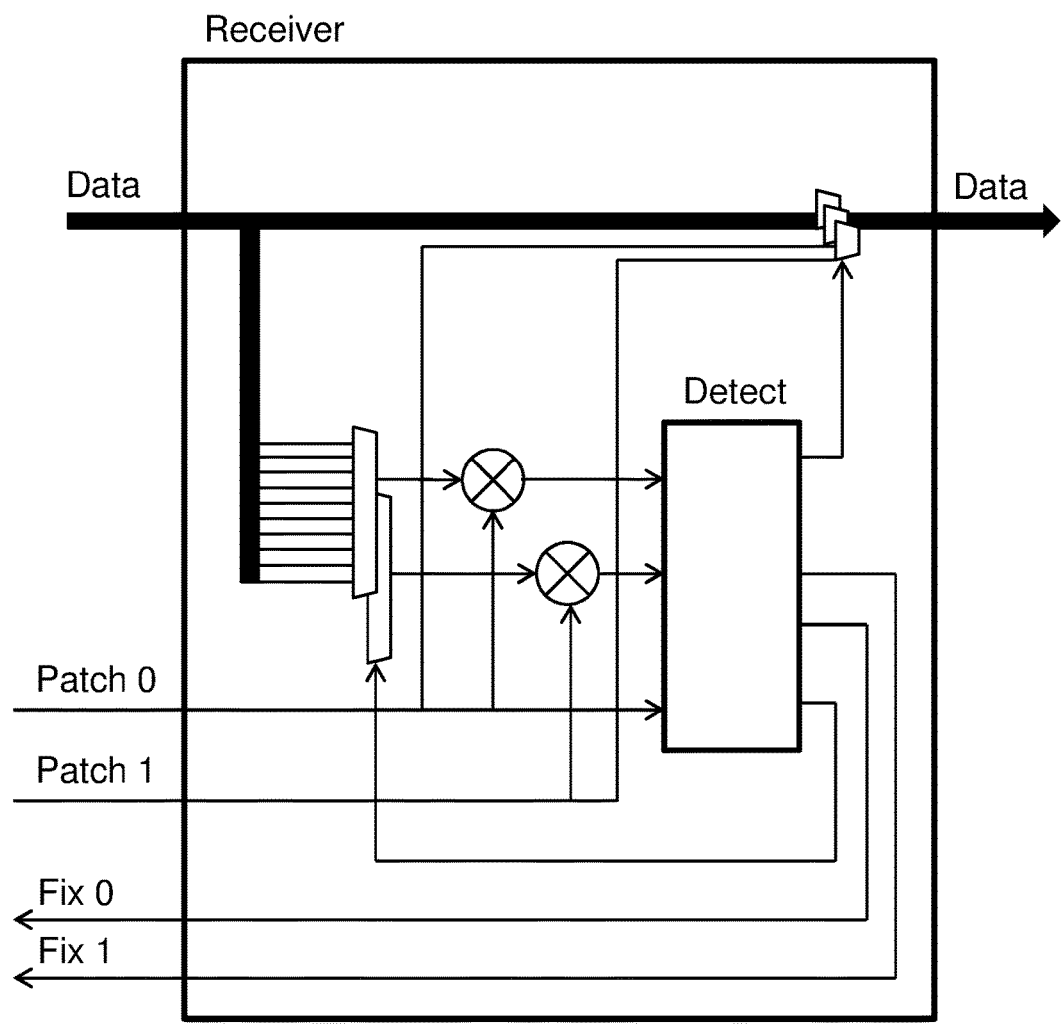
FIG. 8 illustrates a receiver for an error-prone link with Patch and Fix signals according to the invention.

FIG. 8 shows details of the receiver. When a pulse is received on the Patch 0 signal, a Detect module begins an expected test sequence. Patch 0 and Patch 1 signals are compared to data bits selected according to the sequence. If a comparison finds a mismatch then the detector increments a counter associated with the data bit. Once every million cycles all counters decrement, saturating at zero. If the count reaches three for a bit on a Patch 0 or Patch 1 mismatch, the Detect module asserts Fix 0 or Fix 1 respectively. It also locks a mux on the Data signal to use the Patch signal rather than the Data bit signal.

Figure 9A:
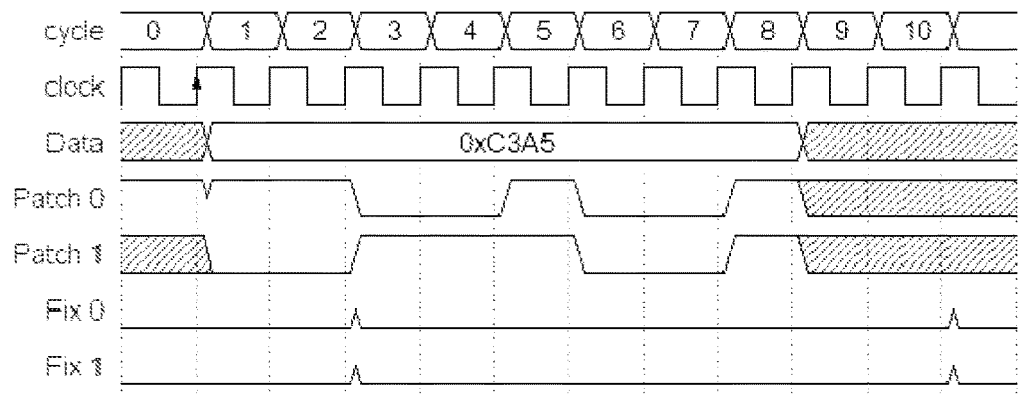
FIG. 9a and FIG. 9b illustrate timing diagrams for test sequences on a link according to the invention.
Figure 9B:
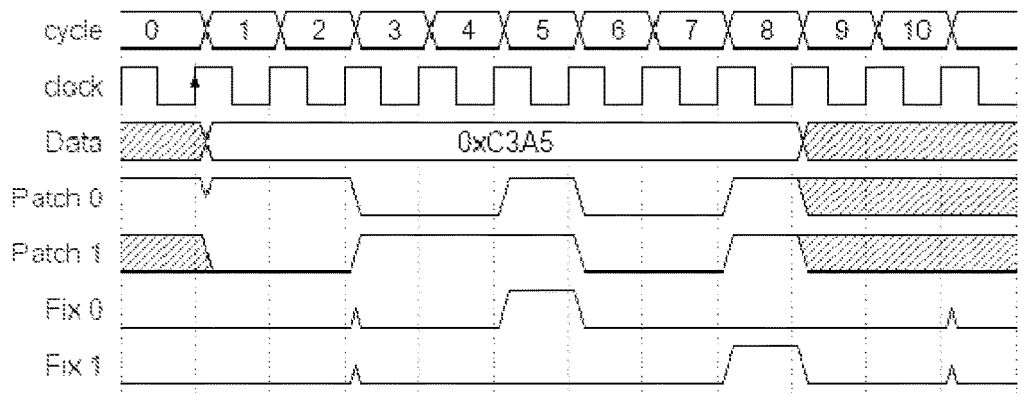

FIG. 9 (*a*) shows a timing diagram for signals at a transmitter link interface for a correctly functioning link. At clock cycle 0, a pulse on Patch 0 signals the beginning of the test sequence. The transmitter drives hex value 0xC3A5 on the 16-bit data bus, which in binary, starting from the least significant bit, is 10_10_01_01_11_00_00_11. The transmitter drives the even numbered bits on the Patch 0 signal and the odd numbered bits on the Patch 1 signal. Correct operation is confirmed by the fact that the Fix 0 and Fix 1 signals are low starting at cycle 3, two cycles after the transmitter begins sending. The two cycles are one each for the downstream Patch pipeline registers and the upstream Fix pipeline registers.

FIG. 9 (*b*) shows a timing diagram for signals at a transmitter link interface for one manifestation of a link that has a short between bit 4 and bit 11. The receiver identifies a mismatch with the Patch 0 signal when compared to data bus bit 4. That is signaled, and received by the transmitter in cycle 5. The receiver identifies a mismatch with the Patch 1 signal when compared to data bus bit 11. That is signaled, and received by the transmitter in cycle 8. Upon receiving those signals, at the end of the test procedure (after cycle 1) the transmitter permanently ties the Patch 0 signal to bit 4 and the Patch 1 signal to bit 11. The receiver will mux those patch signals in to the data bus.

Dynamic Serialization for Power Saving

Some datapaths must be wide to handle maximum-case bandwidth requirements, and must remain powered on to provide access during low-bandwidth use cases. Keeping the full datapath logic powered up wastes clock and leakage power. This is major if low-bandwidth use cases are much more common than maximum-bandwidth use cases.

Some embodiments of the invention dynamically apply narrowing and widening serialization adapter pairs to avoid using parts of datapath, and then power off the unused datapath portions when not needed. This is done with a separate clock tree for eliminating clock toggling power and separate power net for supply power-off.

One embodiment of a chip according to the invention has a high-throughput 64-bit wide video display interface near a low-throughput 16-bit wide microcontroller, both on the opposite side of the chip from a DRAM memory interface. The video display interface and the microcontroller share a 64-bit link to the DRAM interface. When the video display is turned off, only the microcontroller uses the link, so the chip powers off 48 bits of the datapath, and leaves just 16 bits enabled to provide the throughput needed for the microcontroller.

Embodiments should provide for safely powering off parts of the datapath to avoid the loss of data transiting the link. Some embodiments indicate the datapath width, on a sideband signal, with each data beat. Some embodiments include a width signal in conjunction with the clock and reset system-control signals. The width signal acts as a clock gate on the logic that is turned off.

Embodiments should also ensure that the width does not change when a partial word is stored in a serialization adapter. Some embodiments do so by indicating a datapath width in packet headers. In some embodiments a single bit is sufficient to indicate whether links are to operate as wide or as narrow.

In some embodiments NIUs have a sideband output indicating the width of the widest pending packet. A sideband manager unit is used for software to monitor that state in order to decide when it is safe to power off part of the datapath. As with DVFS, software is responsible for monitoring operating conditions.

Starting in high bandwidth mode, software decreases the mode to a narrower one. After the widest pending packet signal becomes narrower, software powers off the upper parts of the datapath. Starting in low bandwidth mode, software powers on the upper parts of the datapath. When power is applied, software increases the mode to a wider one.

In some embodiments, all datapath bits are used to transfer header information, and therefore must be powered on for any packet to transit the link. In some embodiments, dynamic serialization for power savings is only used on links with None header penalty, whereby header bits are in parallel with data. In other embodiments, header and data are serialized, but only certain datapath wires are used for header information. The other datapath wires are candidates for power-off. In some embodiments links use multiple cycles on fewer than ½ of the datapath wires to send headers, at the cost of extra latency, but with the benefit of being able to power off a larger portion of the datapath. In some embodiments header penalty is adapted as part of the power-off and power-on procedure.

In some embodiments width adaptation for power savings is used only within the NoC transport. In other embodiments, width adaptation is used at transaction interfaces between the NoC and other units in the system. In some embodiments width adaptation within a NoC is used to match the width of dynamic inter-chip links.

To the extent that the terms "including", "includes", "having", "has", "with", or variants thereof are used in either the detailed description and the claims, such terms are intended to be inclusive in a similar manner to the term "comprising". The invention is described in accordance with the aspects and embodiments in the following description with reference to the figures, in which like numbers represent the same or similar elements.

Unless defined otherwise, all technical and scientific terms used herein have the same meaning as commonly understood by one of ordinary skill in the art to which this invention belongs. The verb couple, its gerundial forms, and other variants, should be understood to refer to either direct connections or operative manners of interaction between elements of the invention through one or more intermediating elements, whether or not any such intermediating element is recited. Any methods and materials similar or equivalent to those described herein can also be used in the practice of the invention. Representative illustrative methods and materials are also described.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the invention is not entitled to antedate such publication by virtue of prior invention. Further, the dates of publication provided may be different from the actual publication dates which may need to be independently confirmed.

Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein.

In accordance with the teaching of the invention a computer and a computing device are articles of manufacture. Other examples of an article of manufacture include: an electronic component residing on a mother board, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

The article of manufacture (e.g., computer or computing device) includes a non-transitory computer readable medium or storage that may include a series of instructions, such as computer readable program steps or code encoded therein. In certain aspects of the invention, the non-transitory computer readable medium includes one or more data repositories. Thus, in certain embodiments that are in accordance with any aspect of the invention, computer readable program code (or code) is encoded in a non-transitory computer readable medium of the computing device. The processor or a module, in turn, executes the computer readable program code to create or amend an existing computer-aided design using a tool. The term "module" as used herein may refer to one or more circuits, components, registers, processors, software subroutines, or any combination thereof. In other aspects of the embodiments, the creation or amendment of the computer-aided design is implemented as a web-based software application in which portions of the data related to the computer-aided design or the tool or the computer readable program code are received or transmitted to a computing device of a host.

An article of manufacture or system, in accordance with various aspects of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

Accordingly, the preceding merely illustrates the various aspects and principles as incorporated in various embodiments of the invention. It will be appreciated that those of ordinary skill in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

Therefore, the scope of the invention is not intended to be limited to the various aspects and embodiments discussed and described herein. Rather, the scope and spirit of invention is embodied by the appended claims.

What is claimed is:

1. A Network-on-Chip comprising:
a plurality of links that carries header information and data information;
a narrowing serialization adapter coupled to the upstream side of the plurality of links that includes an error-prone link; and
a widening serialization adapter coupled to the downstream side of the plurality of links that includes the error-prone link,
wherein when an error in a header information is detected due to the error-prone link, then a none-to-one serialization adapter is enabled upstream of the error-prone link and a one-to-none serialization adapter is enabled downstream of the error-prone link thereby allowing transmission of the header information across the error-prone link and
wherein the narrowing serialization adapter and the widening serialization adapter can be bypassed.

2. At least one non-transient computer-readable medium storing hardware description language source code, such that when the code is executed by a processor, the processor causes a system to:
identify at least one error-prone link in the system;
identify a bypassable narrowing serialization adapter coupled to the upstream side of the error-prone link;
identify a bypassable widening serialization adapter coupled to the downstream side of the error-prone link;
detect an error in a header information on the error-prone link;
enable a none-to-one serialization adapter is upstream of the error-prone link; and
enable a one-to-none serialization adapter is downstream of the error-prone link thereby allowing transmission of the header information across the error-prone link.

3. A system comprising:
a plurality of links that carry data and header information, wherein the plurality of links include at least one error-prone link;
a none-to-one serialization adapter coupled to the plurality of links; and
a one-to-none serialization adapter coupled to the plurality of links;
wherein when an error in a header information is detected on the error-prone link, then the none-to-one serialization adapter is enabled upstream of the error-prone link and a one-to-none serialization adapter is enabled downstream of the error-prone link thereby allowing transmission of header information across the error-prone link.

* * * * *